W. G. CHARLEY.
ROAD VEHICLE SUSPENSION.
APPLICATION FILED AUG. 23, 1915.
1,226,468. Patented May 15, 1917.
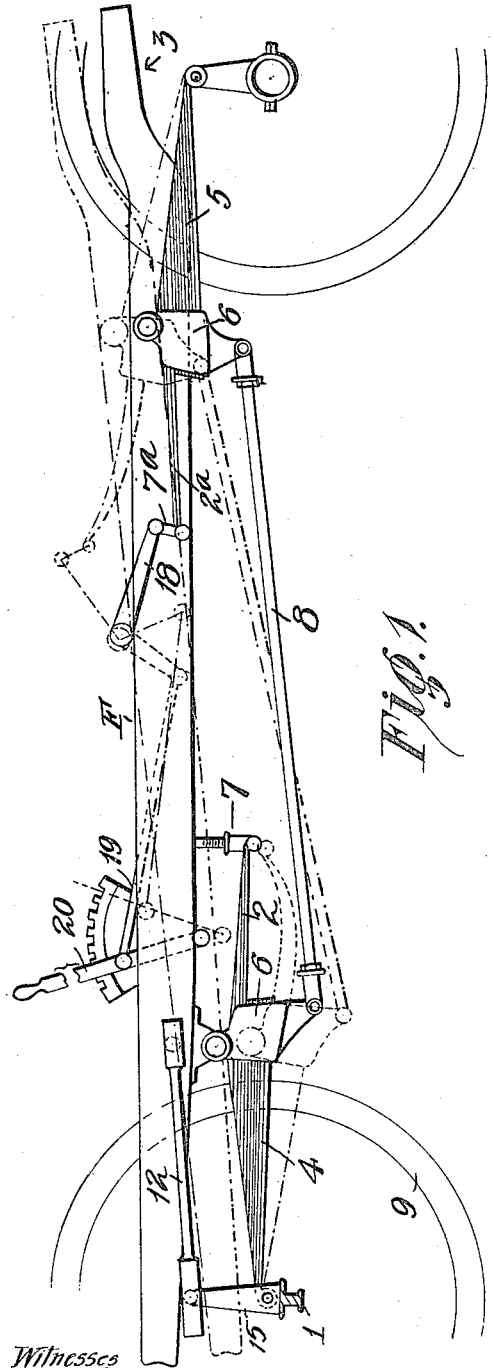
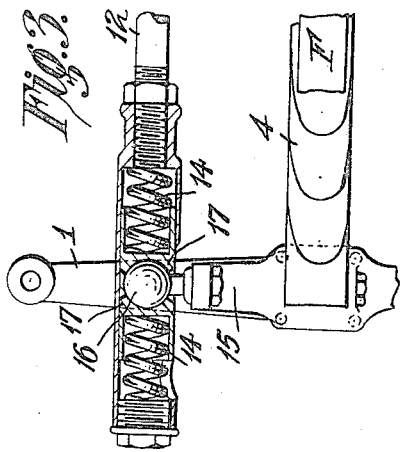
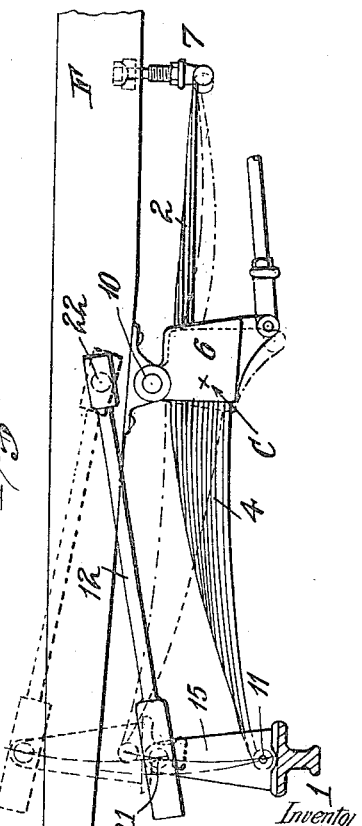
Witnesses
Inventor
Walter G. Charley,
by
Attorney.

UNITED STATES PATENT OFFICE.

WALTER GEORGE CHARLEY, OF MURRUMBEENA, VICTORIA, AUSTRALIA.

ROAD-VEHICLE SUSPENSION.

1,226,468.

Specification of Letters Patent.

Patented May 15, 1917.

Application filed August 23, 1915. Serial No. 46,909.

*To all whom it may concern:*

Be it known that I, WALTER GEORGE CHARLEY, a subject of the King of Great Britain, residing at Dandenong Road, Murrumbeena, in the State of Victoria, Commonwealth of Australia, engineer, have invented certain new and useful Improvements in and Relating to Road-Vehicle Suspension, of which the following is a specification.

This invention relates to improvements in road vehicle suspension and has for its object the simplification of construction relating to synchronization of springs front with rear. The invention comprehends the provision of means for keeping the front axle in a substantially vertical position; of means for preventing undue strain on the members when negotiating uneven surfaces; and of means whereby the plane controlling springs may be conveniently and quickly deflected to render them more capable of resisting undue depression at the load carrying end of the vehicle.

The invention is illustrated by the accompanying drawings whereof Figure 1 is a side elevation of a chassis illustrating the improvements.

Fig. 2 is an enlarged side elevation of the left hand side of Fig. 1.

Fig. 3 is an enlarged plan showing the end of the radius rod and connections.

Referring to these drawings it will be seen that the top parts of the single front and rear springs 4, 5 extend through housings 6 to shackles 7, 7ª. The extension 2 attached to frame F as shown, by virtue of the interconnecting rod 8, works in conformity with the other extension 2ª on the same side. This serves to keep the vehicle (other than the wheels and their attendant parts) in normal plane with the road. The front spring 4 is placed immediately underneath the frame F (see Fig. 3) thus preventing undue torsional strain on the frame without recourse to members connecting one side with the other.

In the case of one of the front wheels 9 striking an obstruction the spring 4 carrying same is deflected as in Fig. 2 with the result that the distance between the centers of pivots 10—11 of same proportionately varies, thus the axle on that side is forced to move forward relatively on that side. In order that undue strain may not thus be put on the radius rod 12 there is provided adjustable means as shown in Fig. 3 which may be in the form of a pair of springs 14 suitably placed in the radius rod, one spring acting against the other. A rigid arm 15 extends upwardly from the axle 1 and carries the ball 16, said ball having a divided seating 17 against which the springs 14 abut.

In cases where the vehicle is unevenly loaded provision is made for putting extra stress on the plane controlling springs 2ª at the rear end 3 of the frame thus leveling up the vehicle body when so loaded.

This may be done by a bell crank lever 18 or by an eccentric, and may be operated through the medium of a connecting rod 19 by a spring toothed lever 20 as shown by dotted lines Fig. 1 which are exaggerated for clearness.

Referring to the front system, the supporting spring (see Fig. 2) acting as a radius member and certain deflections taking place due to uneven surfaces on the road, a mean center is taken which is not the pivot 10 for the rocker, said rocker being the spring 4 and housing 6 combined, but is the mean center of the arc described by the end of the spring. The factor deciding this mean center would be the amount of camber in the spring and its yielding under strain; thus if the maximum deflection of the spring were to a straight line, the distance between the centers would be gradually lengthened under deflection and the mean center of radius would be appreciably away from the pivot 10. This mean center of radius C, Fig. 2, for the spring is taken as one of the centers of a parallelogram 11—C—21—22 another center being the pivoted end 11 of the spring 4 at the axle 1 while the other two centers are in the ball and socket joints 21—22 of the radius rod 12 situated above the spring, one of said ball joints being placed at a distance and angle from the mean center of radius described by the spring.

I claim:—

1. In a road-vehicle suspension, the combination of a pair of vehicle-supporting springs, one arranged in front of the other; a pair of members carried by the frame of the vehicle; a housing pivoted to each of said members, each housing having one of said springs extending therethrough; a pair of members, one for each spring, attached to said frame, and to which the extended inner ends of said springs are connected; a rod connecting the lower ends of the housings;

and a radius rod for the front spring, pivoted at one end to the frame and having an extensible and contractible bearing at its other end to prevent axle torque and to maintain the wheel steering pivots substantially vertical.

2. In a road-vehicle suspension, the combination of a pair of vehicle-supporting springs, one arranged in front of the other; a pair of members carried by the frame of the vehicle; a housing pivoted to each of said members, each housing having one of said springs extending therethrough; a pair of members, one for each spring, attached to said frame, and to which the extended inner ends of said springs are connected; a rod connecting the lower ends of the housings; and a radius rod for the front spring, having a ball-and-socket connection both at its rear end with the frame and at its front end with the axle, said front connection having a pair of springs bearing at opposite sides against the socket member thereof, so as to permit the distance between the two ball members of the connection to vary in conformity with spring deflection.

3. In a road-vehicle suspension, the combination of a pair of vehicle-supporting springs, one arranged in front of the other; a pair of members carried by the frame of the vehicle; a housing pivoted to each of said members, each housing having one of said springs extending therethrough; a pair of members, one for each spring, attached to said frame, and to which the extended inner ends of said springs are connected; a rod connecting the lower ends of the housings; and a lever connected to deflect the rear spring, so as to level up the rear end of the frame and thus maintain the frame in a substantially normal plane with the road when unevenly loaded.

In testimony whereof I have hereunto set my hand.

WALTER GEORGE CHARLEY.

Copies of this patent may be obtained for five cents each, by addressing the "Commissioner of Patents. Washington, D. C."